United States Patent
Chuang et al.

(10) Patent No.: US 10,395,391 B1
(45) Date of Patent: Aug. 27, 2019

(54) SYSTEM AND METHOD OF AUTOMATIC CALIBRATION OF PRINCIPAL POINT

(71) Applicant: NATIONAL CHIAO TUNG UNIVERSITY, Hsinchu (TW)

(72) Inventors: Jen-Hui Chuang, Hsinchu (TW); Yong-Sheng Chen, Taipei (TW); Mu-Tien Lu, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/112,090

(22) Filed: Aug. 24, 2018

(30) Foreign Application Priority Data

Apr. 17, 2018 (TW) .............................. 107113088 A

(51) Int. Cl.
| | |
|---|---|
| *G06K 9/52* | (2006.01) |
| *G06T 7/80* | (2017.01) |
| *G08C 17/02* | (2006.01) |
| *H04N 5/232* | (2006.01) |

(52) U.S. Cl.
CPC .................. *G06T 7/80* (2017.01); *G06K 9/52* (2013.01); *H04N 5/23222* (2013.01); *G06T 2207/30244* (2013.01); *G08C 17/02* (2013.01)

(58) Field of Classification Search
CPC . G06T 7/80; G06T 3/005; G06K 9/52; H04N 5/23222
See application file for complete search history.

(56) References Cited

U.S. PATENT DOCUMENTS

| | | | |
|---|---|---|---|
| 7,505,067 B2 | 3/2009 | Ogawa et al. | |
| 8,208,029 B2 | 6/2012 | Kim et al. | |
| 9,210,303 B2 | 12/2015 | Chou et al. | |
| 9,960,713 B2 | 5/2018 | Akita et al. | |
| 2010/0262995 A1* | 10/2010 | Woods | G06T 15/20 725/40 |

FOREIGN PATENT DOCUMENTS

| | | |
|---|---|---|
| CN | 101520897 A | 9/2009 |
| TW | I279740 B | 4/2007 |

(Continued)

OTHER PUBLICATIONS

Hu et al., "Instance selection for efficient and reliable camera calibration", 2016 IEEE International Conference on Robotics and Automation (ICRA), Stockholm, Sweden, May 16-21, 2016, total 6 pages.

(Continued)

*Primary Examiner* — Nicholas G Giles
(74) *Attorney, Agent, or Firm* — Birch, Stewart, Kolasch & Birch, LLP

(57) ABSTRACT

A camera principal point automatic calibration system including an image acquiring device, a controller, a first display and a second display is provided, wherein the controller controls the first and second display to display parallel first line and second line. The controller selectively rotates the first and second line according to whether a first and second image line generated by the image acquiring device corresponding to the first and second line are parallel or not, and the controller calculates the principal point from parallel first image line and second image line.

10 Claims, 8 Drawing Sheets

(56) References Cited

FOREIGN PATENT DOCUMENTS

TW    I375112 B    10/2012
TW    I511086 B    12/2015

OTHER PUBLICATIONS

Kim et al., "Estimating Intrinsic Parameters of Cameras using Two Arbitrary Rectangles", IEEE Computer Society, Proceedings of the 18th International Conference on Pattern Recognition (ICPR'06), 2006, total 4 pages.

Sagawa et al., "Accurate calibration of intrinsic camera parameters by observing parallel light pairs", 2008 IEEE International Conference on Robotics and Automation, Pasadena, CA, USA, May 19-23, 2008, total 8 pages.

Zhang, Zhengyou, "A flexible new technique for camera calibration", IEEE Transactions on pattern analysis and machine intelligence, 22.11 (2000): 1330-1334, total 22 pages.

\* cited by examiner

SYSTEM AND METHOD OF AUTOMATIC CALIBRATION OF PRINCIPAL POINT

FIELD OF INVENTION

The present invention relates to an automatic principal point calibration system and method; more particularly, the present invention relates to an automatic principal point calibration system and method for an image capturing device.

BACKGROUND OF THE INVENTION

The traditional calibration method for camera's parameters can roughly categorize into two types: one is building a precise world coordinate system with an elaborately arranged three-dimensional space, and calculating the camera's parameters using space transformation and mapping transformation. The method has advantage such as high accuracy, and the disadvantage is requirement of larger space and expensive labor to arrange the three-dimensional space to practically build up a precise world coordinate system. The other type of the method is matching the similarity of the real world scenario with different angles of view using fixed camera parameters, and the camera parameters can be calculated with limited angles of view. The method has advantage such as needless of working space and labor, and the disadvantage is low accuracy.

However, the automation manufacturers still face challenges with the two methods. The reasons include:
(1) in the stage of rotating the calibration plate by human, the result will be different, and the error will be produce between operations by different people, which is not allowable in the manufacturing stage; and
(2) in order to get a better accuracy, more images of different calibration plates is needed, and using the approximation algorithm of algebra to derive space transformation matrix and mapping matrix allow calculation of camera's parameter. However, under the fixed camera's parameter, the intrinsic parameters of the camera must be unchanged. Too many images of the calibration boards will cause uniformity problems of the camera's intrinsic parameters.

SUMMARY OF THE INVENTION

The purpose of the present invention is to provide a method and a system automatically calibrating principal point of image capturing device.

Another purpose of the present invention is provide a method and system improving the accuracy of world coordinate system and reducing requirements of working space and expensive labor.

Another purpose of the present invention is provide an automatic calibration method and system being able to dynamically generate calibration image using flat screen display, find the correspondence between the display and the image capturing device in three-dimensional space and calibrate in the preferable angle.

Another purpose of the present invention is provide an automatic calibration method and system being able to calculate principal point of image capturing device using spacial and geometrical correspondence between display and image capturing device, without the needs of extrinsic parameters (spacial transformation) of image capturing device, and the uniformity of the image capturing device can be remained.

The automatic principal point calibration system of the present invention includes image capturing device, controller, first display and second display, wherein the controller is respectively connected to the image capturing device, the first display, and the second display. The controller operates: (1) drive the image capturing device and capture an image of first line and second line display by the display, wherein the first line and the second line are substantially parallel on display surface of the first display; (2) control the first display and rotate the first line and the second line until a first image line and a second image line are parallel in the image captured by the image capturing device, wherein the first and second image lines are the images of the first and second lines; (3) control the first display and display first and second perpendicular lines on the display surface, wherein the first and second perpendicular lines are parallel and perpendicular to the first and the second lines; (4) determine the intersection of a first perpendicular image line and a second perpendicular image line in the image captured by the image capturing device, wherein the first and second perpendicular image lines are corresponded to the first and second perpendicular lines; (5) determine a first straight line crossing the intersection and being perpendicular to the first and second image lines; (6) using steps (1) to (5) to determine a second straight line from a second display, wherein the second display is disposed near the first display, and the display surface of the second display and the display surface of the first surface possess an inclined angle; and (7) determine the intersection of the first and second straight lines as a principal point of image.

The automatic principal point calibration method of the present invention includes: (1) drive the image capturing device so as to capture image of first and second lines displayed by a first display, wherein the first and the second line on the display surface of the display are substantially parallel, and the image capturing device is disposed at a distance from the display surface; (2) control the first display and rotate the first and second lines until a first image line and a second image line are parallel in the image captured by the image capturing device, wherein the first and second image lines are the images of the first and second lines; (3) control the first display and display first and second perpendicular lines on its display surface, wherein the first and second perpendicular lines are parallel and perpendicular to the first and the second lines; (4) determine the intersection of a first perpendicular image line and a second perpendicular image line in the image captured by the image capturing device, wherein the first and second perpendicular image lines are corresponded to the first and second perpendicular lines; (5) determine a first straight line crossing the intersection and being perpendicular to the first and second image lines; (6) using steps (1) to (5) to determine a second straight line from a second display, wherein the second display is disposed near the first display, and the display surface of the second display and the display surface of the first surface possess an inclined angle; and (7) determine the intersection of the first and second straight lines as a principal point of image.

DETAILED DESCRIPTION OF THE PREFERRED EMBODIMENTS

Please refer to the following drawing and description of automatic principal point calibration system and method of the present invention. Different embodiment of the automatic principal point calibration system and method will be described in the following description; however, the present invention is not limit to the presented figures and the following description.

Figure 1:
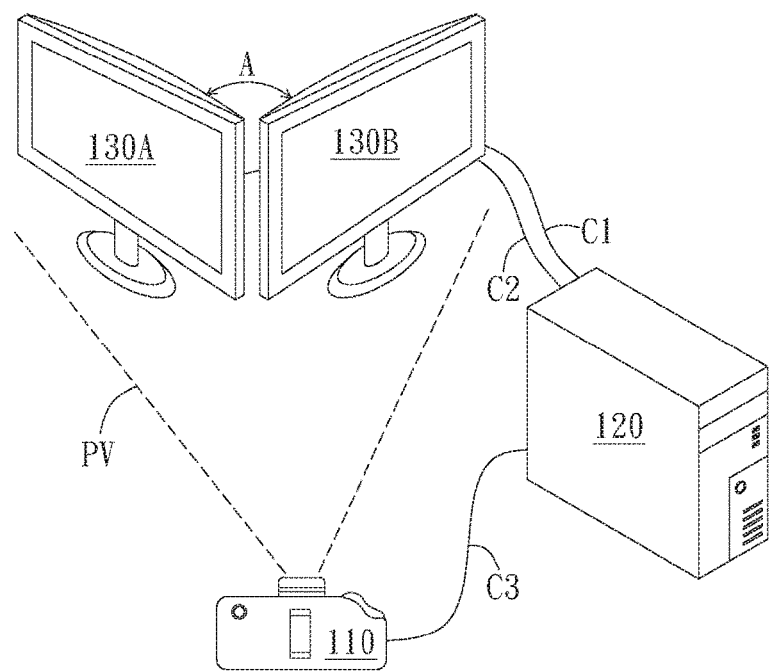
FIG. 1 is a schematic view of automatic principal point calibration system of an embodiment of the present invention.

FIG. 1 is a schematic view of automatic calibration system in an embodiment of the present invention. In the embodiment, the automatic calibration system 100 includes at least one image capturing device 110, controller 120 and first display 130A; however, in other different embodiments, the automatic calibration system 100 can further includes a second display 130B.

As shown in FIG. 1, in the embodiment, the controller 120 is respectively connected to the image capturing device 110, the first display 130A and the second display 130B. In one embodiment, the image capturing device 110 can include smart phone, digital camera, video camera, or other electronic device with image capturing function, but the invention is not limit thereof.

In the embodiment, the controller 120 can be a processor (such as microprocessor, central processing unit, integrated circuit, or device such as computer or server), and it is configured to control display image of the first display 130A (and the second display 130B), and it is able to receive the image captured by the image capturing device 110 from the first display 130A and/or the second display 130B. "The image captured by the image capturing device 110 from the first display 130A and/or the second display 130B" mentioned above indicated the image the first display 130A (and the second display 130B) projected and generated at the position and angle of view of the image capturing device 110. For example, if the image capturing device 110 is a digital camera, the image generated by the image capturing device 110 is a projection of the first display 130A (and the second display 130B).

As shown in FIG. 1, the controller 120 can electrically connected to the first display 130A and the second display 130B respectively through the signal connection C1 and C2; however, in the other different embodiments, the controller 120 can respectively connect to the first display 130A and the second display 130B through wireless connection. Nevertheless, the connection between the controller 120 and the image capturing device 110 may include wired or wireless connection, but the invention is not limited thereof. In other different embodiments, the controller 120 can directly be disposed in the image capturing device 110. For example, the image capturing device 110 and the controller 120 can be configured in the same device (for example, the image capturing device 110 can be a camera, and the controller 120 can be a processor or an integrated circuit in the camera).

Figure 2:
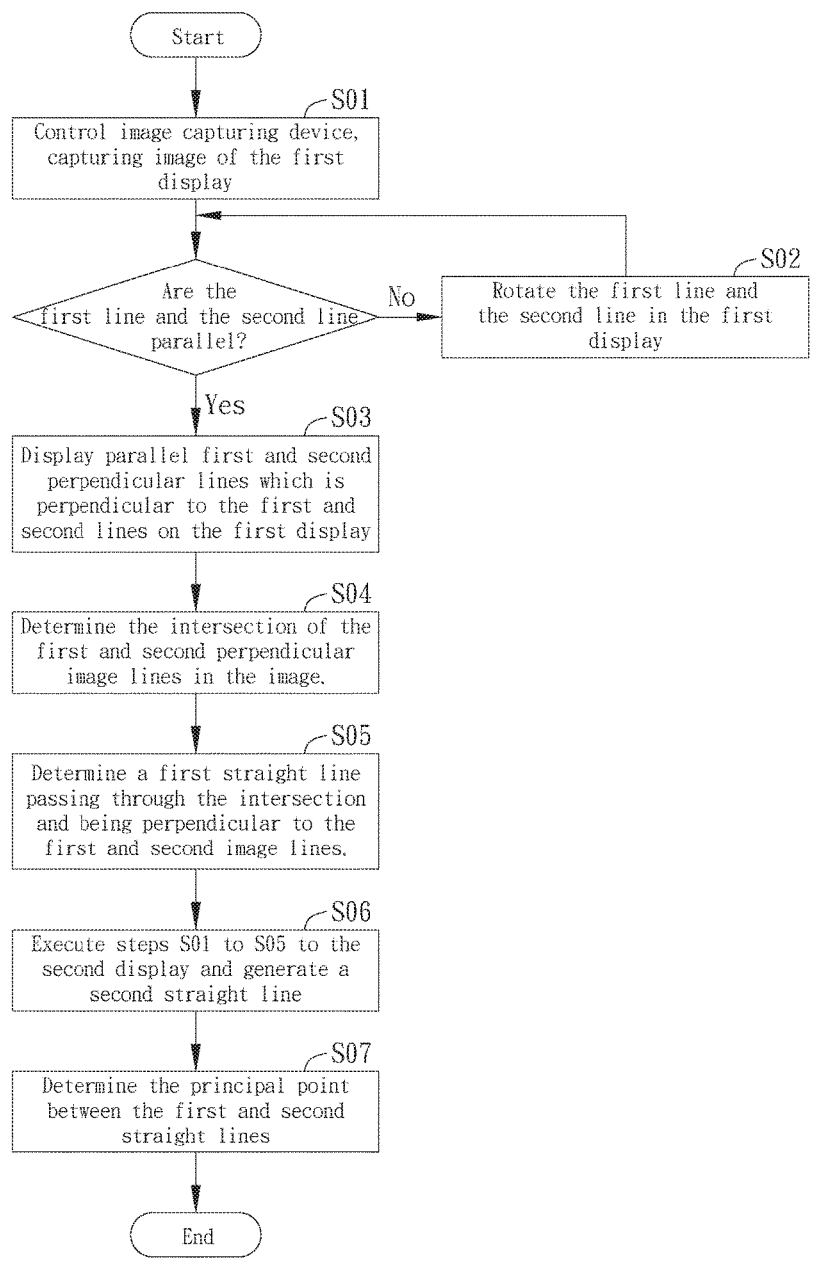
FIG. 2 is a flow chart of automatic principal point calibration method of an embodiment of the present invention.

FIG. 2 is a flow chart of automatic calibration method that can utilize on the automatic calibration system 100. In the embodiment, the automatic calibration method includes steps S01-S07, the following description will further explain the steps S01-S07.

In the embodiment, when the second display 130B is disposed beside the first display 130A, the display images of the first display 130A and the second display 130B are individually located in the range of the angle of view PV of the image capturing device 110 (as shown in FIG. 1), and an angle A is formed between the display surface of the first display 130A and the display surface of the second display 130B.

Figure 3:
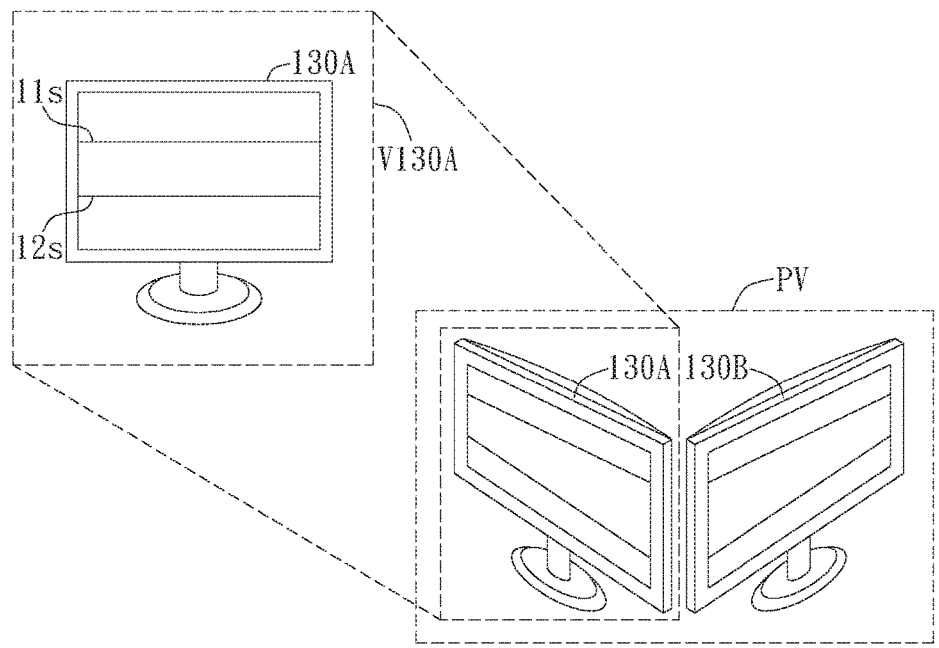
FIG. 3 is a schematic view of the first display and the second display of FIG. 1.
Figure 4A:
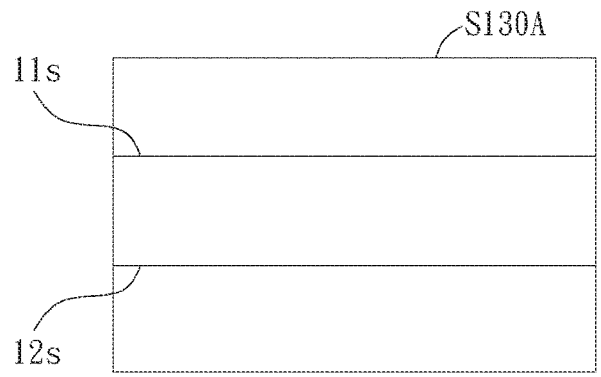
FIG. 4A is a schematic view of display of the first display in FIG. 3.

As shown in FIG. 1 and FIG. 3, the display surface of the first display 130A display a first line 11s and a second line 12s at first. Meanwhile, as shown in the front view V130A of the first display 130A in FIG. 3 and the display image S130A of the first display 130A in FIG. 4A, the first line 11s and the second line 12s are substantially parallel lines. In the embodiment, the first line 11s and the second line 12s are preferable displayed as parallel and horizontal lines shown in the display surface in the first display 130A.

As shown in FIGS. 1 and 2, the step S01 includes driving the image capturing device so as to capture the image of the first display. To be specific, A distance is remained between the image capturing device 110 and the display surface of the first display 130A. Referring to the image captured at the view of angle PV and position of image capturing device 110 corresponding to the display image S130A in FIG. 4A, since the display surface of the first display 130A is not directly facing the image capturing device 110, when watching the first display 130A from the image capturing device 110 at angle PV, a first image line 11p and a second image line 12p in the image of the image capturing device 110 corresponding to the first line 11s and the second line 12s are not parallel according to the vision vanishing theorem, as shown in FIG. 4B (FIG. 4B is the image watching the display image of the first display 130A in FIGS. 3 and 4A at the angle of view PV of image capturing device 110.).

Figure 4B:
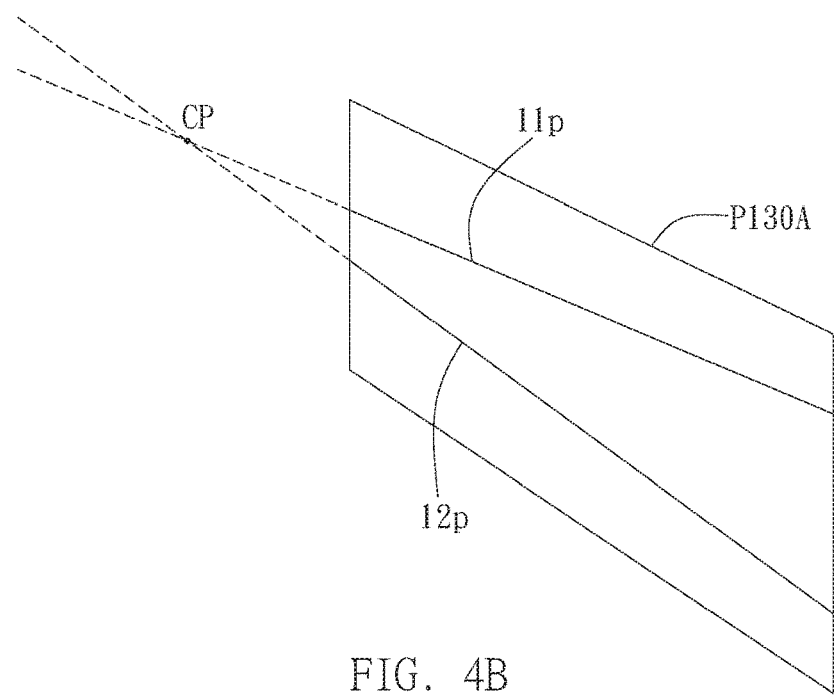
FIG. 4B is a schematic view of image of image capturing device capturing display image of the first display in FIG. 4A at angle of view PV.

The controller 120 drives the image capturing device 110, so as to analyze image P130A with controller 120 when capturing image P130A of the display image S130A (FIGS. 3 and 4A) of the first display 130A as shown in FIG. 4B. In the embodiment, controller 120 determines whether the first image line 11p and the second image line 12p corresponded to the line 11s and line 12s are parallel in the image P130A. In other words, the controller 120 determines the relationship between the first image line 11p and the second image line 12p is parallel or not. According to the determined result, the controller 120 generates a parallel determination result.

In an embodiment, when processing the above determination, the controller 120 can infer the extending direction of the first image line 11p and the second image line 12p in the image P130A, and inferring whether the lines intersect at an intersection point CP. If the first image line 11p and the second image line 12p are not intersecting at the extending direction, the controller 120 determines that the first image line 11p and the second image line 12p are parallel and proceed to step S03; if the intersection point is founded, the controller 120 will proceed to step S02.

Figure 5A:
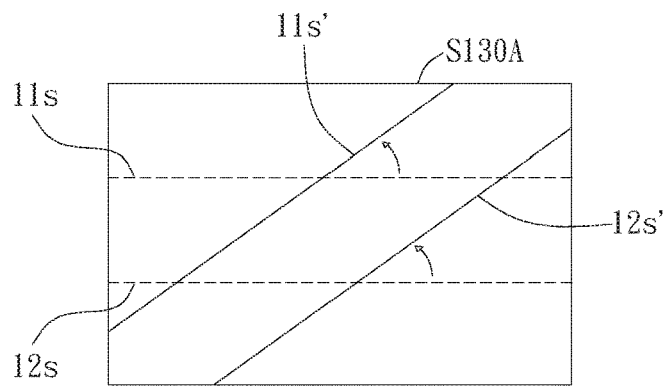
FIG. 5A is a schematic view of rotated parallel lines in FIG. 4A of an embodiment.

As shown in FIGS. 2 and 5A, the step S02 includes rotating the first line 11s and the second line 12s in the first display. To be specific, taking the display image S130A shown in FIG. 5A for example, when the first line 11s and the second line 12s remain parallel to each other, the controller 120 can control the first display 130A and rotate the first line 11s and the second line 12s on the display image S130A of the first display 130A counterclockwise (or clockwise). With the change of display image S130A of the first display 130A, the image capturing device 110 updates the image P130A (that is, generating new image P130 corresponding to the changed display image S130A).

Figure 5B:
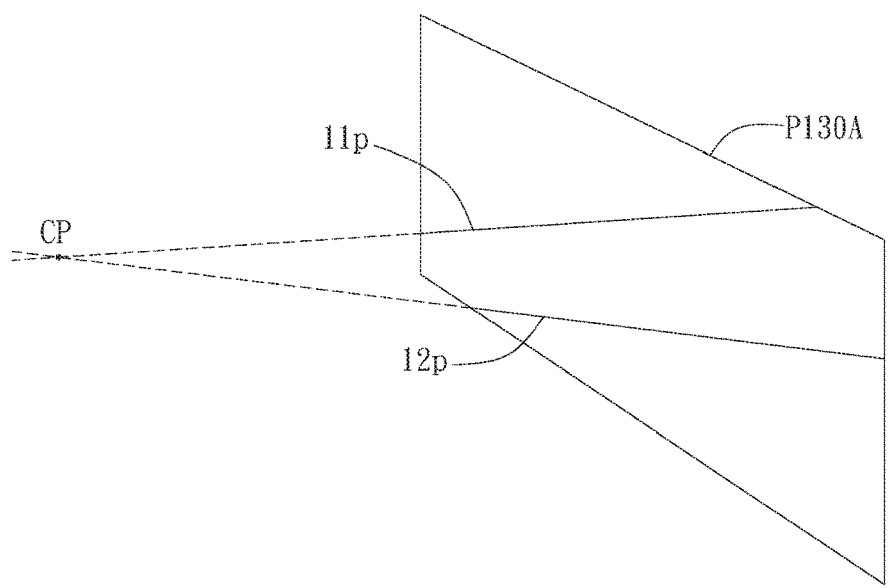
FIG. 5B is a schematic view of image of image capturing device capturing display image of the display in FIG. 5A at angle of view PV.

In the embodiment, the controller 120 selectively (constantly) adjust the speed and range of rotation of the first line 11s and the second line 12s in the display image 130A, and the rotation of the first line 11s and the second line 12s stop when the first image line 11p and the second image line 12p in the image P130A are parallel. Take FIG. 5A for example, on the display image S130A of the first display 130A, positions of the first line 11s and the second line 12s may (possible) rotate from the original position 11s' 12s' to the position shown in FIG. 5A. As shown in FIG. 5B, in the image P130A generated by the image capturing device 110, the first image line 11p and the second image line 12p corresponding to the first line 11s and the second line 12s of the display image S130A still may not be parallel, wherein the first image line 11p and the second image line 12p may intersect at the intersection CP on the extending direction. In this case, the controller 120 determines the first image line 11p and the second image line 12p in the image P130A may still intersect, and therefore the parallel determination result generated by the controller will be result in continuing rotating the first line 11s and the second line 12s.

Figure 6A:
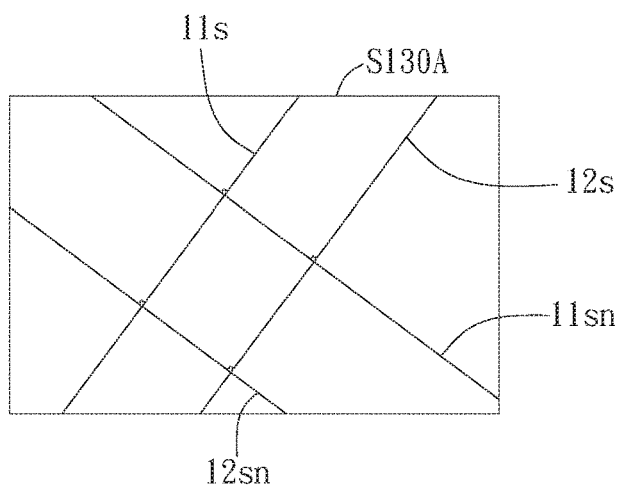
FIG. 6A is another schematic view of FIG. 5A in another embodiment.
Figure 6B:
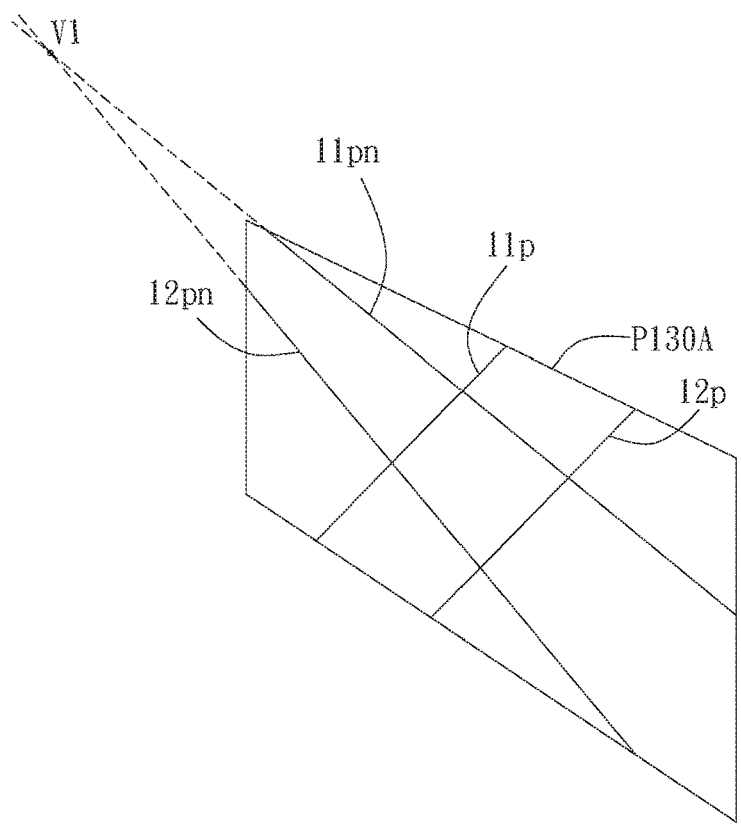
FIG. 6B is another schematic view of FIG. 5B in another embodiment.

Step S03 includes controlling the first display and display a first perpendicular line and a second perpendicular line on its display surface, wherein the first and second perpendicular lines are perpendicular to the first line and the second line. FIG. 6A is an embodiment of display image S130A of the first display; FIG. 6B is an image P130A corresponding to the display image S130A in FIG. 6A. To be specific, as shown in FIGS. 6A and 6B, when the controller 120 found that the rotated first line 11s and second line 12s in the display image S130A allow the first image line 11p and the second image line 12p to be parallel in the image P130, the controller 120 controls the first display 120 and show the first perpendicular line 11sn and the second perpendicular line 12sn in the display image S130A. In the embodiment, the first perpendicular line 11sn and second perpendicular 12sn are parallel, and respectively perpendicular to the first line 11s and the second line 12s.

Step S04 includes determining an intersection of the first perpendicular image line and the second perpendicular image line corresponding to the first perpendicular line and the second perpendicular line. As shown in FIGS. 6A and 6B, the first perpendicular image line 11pn and the second perpendicular image line 12pn in the image P130A, corresponding to the first perpendicular line 11sn and the second perpendicular line 12sn, won't be parallel. In this case, the controller 120 calculates the extension direction of the first perpendicular image line 11pn and the second perpendicular image line 12pn, calculating the intersection V1 of the first perpendicular image line 11pn and the second perpendicular image line 12pn in the image P130A.

Figure 7:
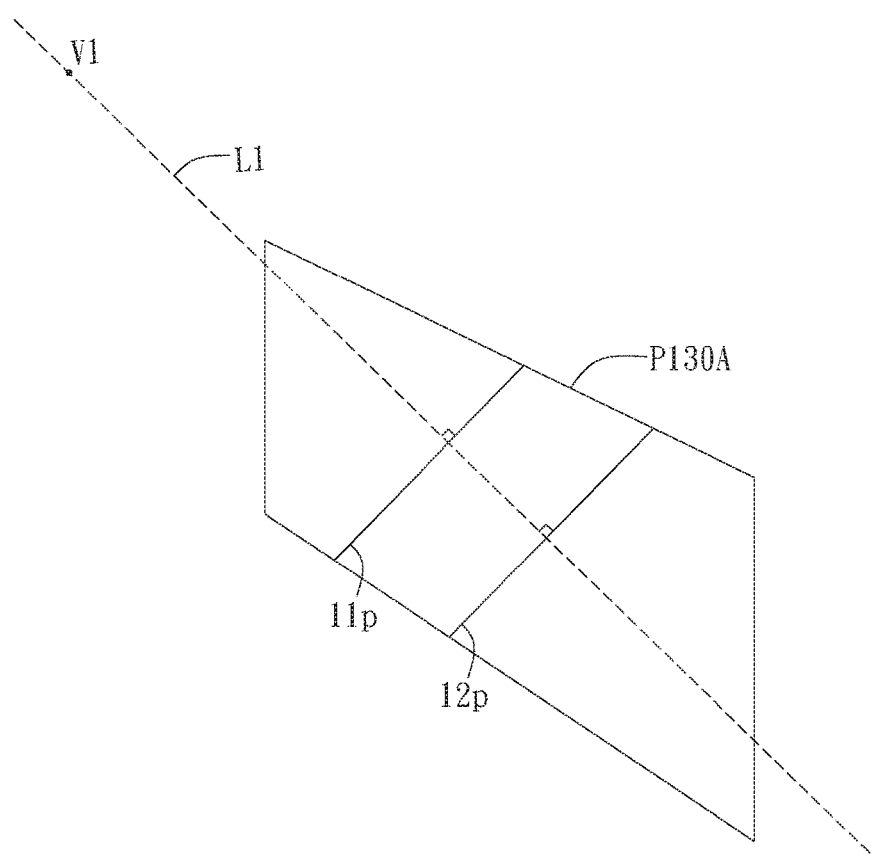
FIG. 7 is a schematic view of determining a first straight line in an embodiment according to the image in FIG. 6B.

Step 05 includes determining a first straight line in the image, wherein the first straight line passes through the intersection and being perpendicular to the first and second image line. To be specific, as shown in FIGS. 6B and 7, when the controller 120 calculate the position of the intersection V1, the controller 120 further calculates a first straight line L1. In the embodiment, the first straight line L1 passes through the intersection V1 and being perpendicular to the first image line 11p and the second image line 12p.

Figure 8:
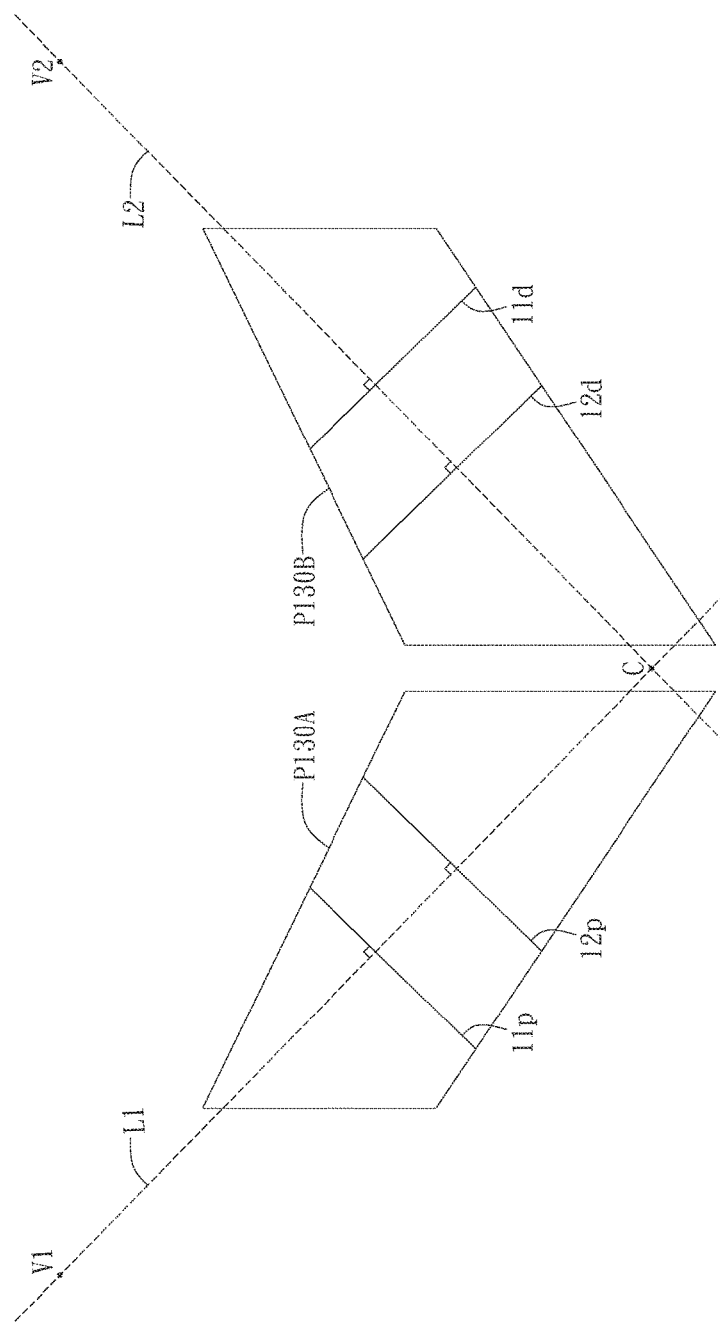
FIG. 8 is a schematic view of FIG. 7 in another embodiment.

Step S06 includes executing the steps S01 to S05 to a second display and generate a second straight line. To be specific, as shown in FIG. 1 to FIG. 3, a second display 130B can be disposed beside the first display 130A. In the embodiment, a tilted angle A is preferably form between the display surfaces of the second display 130B and the first display 130A, and the display surfaces of the first display 130A and the second display 130B are located inside the range of the angle of view PV of the image capturing device 110. As shown in FIG. 8, after executing steps S01 to S05 to the second display 130B, the controller 120 can calculate the intersection point V2 in the image P130B of the second display 130B, and the second straight line L2 passing through the intersection point V2 and being perpendicular to the first image line 11d and the second image line 12d.

Step 07 includes determining the intersection of the first straight line and the second straight line as an image principal point. In the embodiment, as shown in FIG. 8, when the controller 120 calculated the second straight line L2 of the second display 130B, the controller 120 determines the intersection of the first straight line L1 and the second straight line L2 as the image principal point C. After the image principal point C is determined, the controller 120 can automatically calibrate the image capturing device 110 according to the image principal point C.

In the other different embodiment, the second display 130B can actually be the first display. To be specific, after executing the steps S01 to S05 for the first time, the first display 130A can move to the position of the second display 130B in FIG. 1 and becomes the second display 130B, and the steps S01 to S05 can be re-executed again to the second display 130B. However, in the other different embodiment, the first display 130A can move between the positions of the first display 130A and the second display 130B in FIG. 1 during every steps (Step S01 to S05).

The description above of the specific embodiment will fully disclose the general property of the embodiments of this article. After utilizing the knowledge in hand, the embodiment of the present invention can be modified without departing from the spirit and range of the present invention, and therefore the equal meanings and range of the embodiment of the present invention should be fully realized during modification. The wording and phrases in the article are only for description, but not limited thereto. Therefore, when the specific embodiment is described, the technical people in the field should understand that the embodiment of the article can be modified without departing from the spirit and the range of the present invention.

What is claimed is:

1. A automatic principal point calibration method for an image capturing device including:
   (1) drive the image capturing device so as to capture image of first and second lines displayed by a first display, wherein the first and the second line on the display surface of the display are substantially parallel, and the image capturing device is disposed at a distance from the display surface;

(2) control the first display and rotate the first and second lines until a first image line and a second image line are parallel in the image captured by the image capturing device, wherein the first and second image lines are the images of the first and second lines;

(3) display first and second perpendicular lines on the display surface, wherein the first and second perpendicular lines are parallel and perpendicular to the first and the second lines;

(4) determine the intersection of a first perpendicular image line and a second perpendicular image line in the image captured by the image capturing device, wherein the first and second perpendicular image lines are corresponded to the first and second perpendicular lines;

(5) determine a first straight line crossing the intersection and being perpendicular to the first and second image lines;

(6) using steps (1) to (5) to determine a second straight line from a second display, wherein the second display is disposed near the first display, and the display surface of the second display and the display surface of the first surface possess an inclined angle; and (7) determine the intersection of the first and second straight lines as a principal point of image.

2. The method as in claim 1, wherein the step (1) further including:
determine whether the first perpendicular image line and the second perpendicular image corresponding to the first line and the second line are parallel and generate a parallel determination result.

3. The method as in claim 1, wherein the step (2) further including:
while maintaining the state of the first line and the second line being parallel in the display surface, control the first display and rotate the first and second lines.

4. The method as in claim 1, wherein the step (1) further including:
dispose the image capturing device ahead of the first display, but not directly in front of the display surface.

5. The method as in claim 1, wherein the image capturing device has a field of view, and the step (1) further including:
locating the image capturing device at a position where the display surfaces of the first and second display are in the field of view.

6. An automatic principal point calibration system of a image capturing device, including:
at least a display, displaying a first line and a second line, wherein the first line and the second line are parallel, and the image capturing device is placed at a distance in front of the display, and the image capturing device generates an image having first image line and second image line corresponded to the first line and the second line;

a controller, electrically connected to the display and the image capturing device, wherein the controller execute the following steps:

(1) drive the image capturing device and capture an image of the first line and the second line display by the display;

(2) control the display and rotate the first line and the second line until a first image line and a second image line are parallel in the image captured by the image capturing device, wherein the first and second image lines are the images of the first and second lines;

(3) display first and second perpendicular lines on the display surface, wherein the first and second perpendicular lines are parallel and perpendicular to the first and the second lines;

(4) determine the intersection of a first perpendicular image line and a second perpendicular image line in the image captured by the image capturing device, wherein the first and second perpendicular image lines are corresponded to the first and second perpendicular lines;

(5) determine a first straight line crossing the intersection and being perpendicular to the first and second image lines;

(6) using steps (1) to (5) to determine a second straight line from a second display, wherein the second display is disposed near the first display, and the display surface of the second display and the display surface of the first surface possess an inclined angle; and (7) determine the intersection of the first and second straight lines as a principal point of image.

7. The system as in claim 6, wherein the controller determines whether the first perpendicular image line and the second perpendicular image corresponding to the first line and the second line are parallel and generate a parallel determination result.

8. The system as in claim 6, wherein the controller controls the display and rotate the first and the second lines while maintaining the state of the first line and the second line being parallel.

9. The system as in claim 6, wherein the image capturing device is disposed ahead of the first display, but not directly in front of the display surface.

10. The system as in claim 6, wherein the image capturing device has a field of view, and the display surfaces of the display and another display is located in the field of view.

* * * * *